W. R. BLANCHARD.
Shovel Plow.

No. 105,892. Patented Aug. 2, 1870.

Witnesses:
A Benneusendorf
Edgar Tate

Inventor:
W. R. Blanchard
per Munn & Co
Attorneys.

UNITED STATES PATENT OFFICE.

WILLIAM R. BLANCHARD, OF HERTFORD, NORTH CAROLINA.

IMPROVED CORN AND COTTON CULTIVATING PLOW.

Specification forming part of Letters Patent No. 105,892, dated August 2, 1870.

*To all whom it may concern:*

Be it known that I, WILLIAM R. BLANCHARD, of Hertford, in the county of Perquimans and State of North Carolina, have invented a new and useful Improvement in Corn and Cotton Cultivating Plows; and I do hereby declare that the following is a full, clear, and exact description thereof, which will enable others skilled in the art to make and use the same, reference being had to the accompanying drawings, forming part of this specification, in which—

Figure 1:
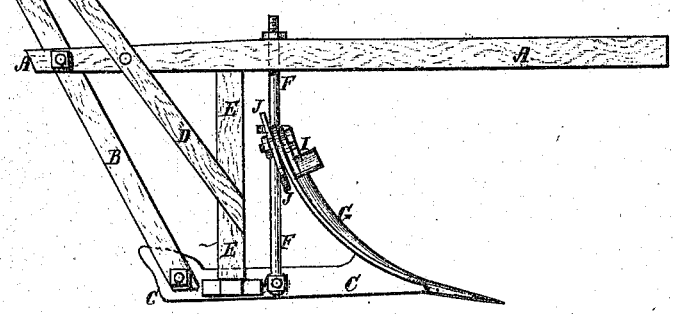
Figure 2:
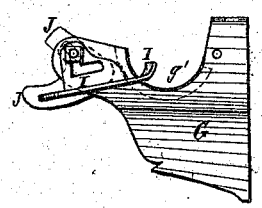
Figure 3:
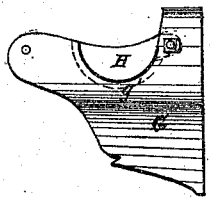

Figure 1 is a side view of my improved plow. Fig. 2 is a front view of the mold-board with the guide-pieces attached and the top piece removed. Fig. 3 is a front view of the mold-board of the plow with the guide-pieces removed and the top piece attached.

Similar letters of reference indicate corresponding parts.

This invention relates to that class of plows employed to ridge or turn a furrow against a row of growing plants; and it consists in the arrangement on a circularly-recessed mold-board of three plates, whereby the superfluous soil carried upon the mold-board may be discharged and the remainder conducted about the stalks of the plant without danger of covering the bud thereof.

G represents the concavity in the mold-board of a "turn-plow;" $g'$, a circular recess therein, and H an adjustable covering-plate, which may be lowered or elevated to leave more or less of an opening.

I is a plate attached to the wing of the mold-board, angularly slotted, so as to allow of its adjustment in correspondence with the plate H. It is also curved at the end, so as to guide the soil thrown against plate H and conduct it under its projecting flange and toward the row of plants.

J is a plate attached to the back part of the mold-board, and serving as an adjustable prolongation of the wing, for the purpose of more completely regulating the points of deposit for the soil conveyed to the row of plants.

It will be perceived that these pieces may be used separately, and be of marked benefit in preventing injury to the plants by overwhelming them with soil; but I preferably use them in combination, as I esteem them thus employed as a most effectual and thorough protection in "laying by" potatoes and other crops of a low growth. With these instrumentalities they can be "hilled" up much or little, according to the nature and requirement of the particular crop.

The mode of operation is as follows: The curved end of plate I and the top of plate H being adjusted and fastened at the same height, according to the amount of soil to be thrown behind the plow, the soil is cut by the share, turned by the concavity G, carried up toward the top of the recess $g'$, and outwardly toward the top of the wing. At this point all the soil that does not go over the recess is arrested by the flange of plate I, which stands at an angle to the mold-board, and by the combined forward movement of the plow and the movement imparted by the mold-board is carried laterally downward below the crown of the plant and about the stalks thereof. The plate J serves as a guide-plate to prevent the soil (being conveyed downward against the angular flange of plate I) from being forced out behind.

Having thus described all that is necessary to a clear understanding of my invention, what I desire to protect by Letters Patent is—

1. A mold-board for ridging-plows, having the concavity G for turning a furrow, a circular recess, $g'$, and an adjustable circular plate, H, attached thereto, all as and for the purpose described.

2. The plates I J, combined with mold-board G, all constructed and relatively arranged on a ridge-plow, as and for the purpose described.

WM. R. BLANCHARD.

Witnesses:
H. S. ELEY,
WILLIS H. BAGLEY.